US006949857B2

(12) United States Patent
Neet et al.

(10) Patent No.: US 6,949,857 B2
(45) Date of Patent: Sep. 27, 2005

(54) STATOR OF A ROTARY ELECTRIC MACHINE HAVING STACKED CORE TEETH

(75) Inventors: Kirk E. Neet, Saline, MI (US); Michael Timothy York, Chelsea, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/988,386

(22) Filed: Nov. 10, 2004

(65) Prior Publication Data

US 2005/0062359 A1 Mar. 24, 2005

Related U.S. Application Data

(63) Continuation-in-part of application No. 10/899,338, filed on Jul. 26, 2004, which is a continuation-in-part of application No. 10/443,441, filed on May 22, 2001.

(60) Provisional application No. 60/454,996, filed on Mar. 14, 2003.

(51) Int. Cl.[7] .................................................. H02K 3/48

(52) U.S. Cl. ......................................... 310/214; 310/42

(58) Field of Search ......................... 310/214, 216–218, 310/201–208, 42, 215

(56) References Cited

U.S. PATENT DOCUMENTS

| | | | |
|---|---|---|---|
| 2,781,465 A | | 2/1957 | Schuff |
| 3,122,667 A | | 2/1964 | Baciu |
| 3,444,407 A | | 5/1969 | Yates |
| 3,566,171 A | | 2/1971 | Tichy et al. |
| 3,634,708 A | | 1/1972 | Fisher et al. |
| 3,660,705 A | | 5/1972 | Willyoung |
| 3,753,060 A | | 8/1973 | Greenwell |
| 3,753,062 A | | 8/1973 | Greenwell |
| 3,780,324 A | | 12/1973 | Greenwell |
| 3,821,846 A | | 7/1974 | Pleis, Jr. et al. |
| 3,838,322 A | | 9/1974 | Greenwell |
| 3,854,077 A | | 12/1974 | Greenwell |
| 3,884,385 A | | 5/1975 | Schaefer |
| 3,990,029 A | | 11/1976 | Kano et al. |
| 4,115,915 A | | 9/1978 | Godfrey |
| 4,176,444 A | | 12/1979 | Walker |
| 4,197,475 A | | 4/1980 | Ban et al. |
| 4,206,621 A | | 6/1980 | Kawasaki et al. |
| 4,451,749 A | | 5/1984 | Kanayama et al. |
| 4,617,725 A | | 10/1986 | Holter et al. |
| 4,757,601 A | | 7/1988 | Leech et al. |
| 4,808,868 A | | 2/1989 | Roberts |
| 4,829,206 A | | 5/1989 | Honshima et al. |
| 4,876,473 A | * | 10/1989 | Tanaka et al. .............. 310/216 |
| 4,896,063 A | | 1/1990 | Roberts |
| 4,959,573 A | | 9/1990 | Roberts |
| 5,231,324 A | | 7/1993 | Kawamura et al. |

(Continued)

FOREIGN PATENT DOCUMENTS

| | | |
|---|---|---|
| EP | 1 134 872 | 9/2001 |
| EP | 1 109 289 | 4/2002 |
| JP | 55 120114 | 9/1980 |
| JP | 56 83911 | 7/1981 |
| JP | 57-20644 A | 12/1982 |
| JP | 58 192447 | 11/1983 |

*Primary Examiner*—Dang Le
(74) *Attorney, Agent, or Firm*—Brinks Hofer Gilson & Lione

(57) ABSTRACT

A stator of a rotary electric machine having secured core slot insulators includes a multi-phase stator winding, having a plurality of slot segments that are adapted to be radially inserted into a plurality of circumferentially spaced axially-extending core slots in a surface of a cylindrically-shaped stator core. The stator winding includes the plurality of slot segments alternately connected at the first and second ends of the stator core by a plurality of end loop segments to form the winding. At least one of the core teeth includes a distal end that is staked such that the distal end of the at least one core tooth is flared outward circumferentially to secure the stator winding within the core slots.

17 Claims, 8 Drawing Sheets

U.S. PATENT DOCUMENTS

| | | | |
|---|---|---|---|
| 5,343,105 A | | 8/1994 | Sakabe et al. |
| 5,444,321 A | | 8/1995 | Honda et al. |
| 5,449,962 A | | 9/1995 | Shichijyo et al. |
| 5,519,266 A | | 5/1996 | Chitayat |
| 5,539,265 A | | 7/1996 | Harris et al. |
| 5,708,316 A | | 1/1998 | Ishida |
| 5,714,824 A | | 2/1998 | Couture et al. |
| 5,864,193 A | | 1/1999 | Katoh |
| 5,936,326 A | | 8/1999 | Umeda et al. |
| 5,955,804 A | | 9/1999 | Kusase et al. |
| 5,955,810 A | | 9/1999 | Umeda et al. |
| 5,962,943 A | | 10/1999 | Shervington |
| 5,965,965 A | | 10/1999 | Umeda et al. |
| 5,986,375 A | | 11/1999 | Umeda et al. |
| 5,994,802 A | | 11/1999 | Shichijyo et al. |
| 5,998,903 A | | 12/1999 | Umeda et al. |
| 6,011,332 A | | 1/2000 | Umeda et al. |
| 6,037,695 A | | 3/2000 | Kanazawa et al. |
| 6,049,154 A | | 4/2000 | Asao et al. |
| 6,051,906 A | | 4/2000 | Umeda et al. |
| 6,059,969 A | | 5/2000 | Mizutani |
| 6,078,116 A | | 6/2000 | Shiga et al. |
| 6,091,169 A | | 7/2000 | Umeda et al. |
| 6,097,130 A | | 8/2000 | Umeda et al. |
| 6,124,660 A | | 9/2000 | Umeda et al. |
| 6,137,201 A | | 10/2000 | Umeda et al. |
| 6,137,202 A | | 10/2000 | Holmes et al. |
| 6,147,430 A | | 11/2000 | Kusase et al. |
| 6,147,432 A | | 11/2000 | Kusase et al. |
| 6,166,461 A | | 12/2000 | Kusase et al. |
| 6,177,747 B1 | | 1/2001 | Maeda et al. |
| 6,181,043 B1 | | 1/2001 | Kusase et al. |
| 6,181,045 B1 | | 1/2001 | Umeda et al. |
| 6,201,332 B1 | | 3/2001 | Umeda et al. |
| 6,204,586 B1 | | 3/2001 | Umeda et al. |
| 6,208,060 B1 | | 3/2001 | Kusase et al. |
| 6,211,594 B1 | | 4/2001 | Umeda et al. |
| 6,222,295 B1 | | 4/2001 | Umeda et al. |
| 6,242,835 B1 | | 6/2001 | Uemura et al. |
| 6,242,836 B1 | | 6/2001 | Ishida et al. |
| 6,252,326 B1 | | 6/2001 | Umeda et al. |
| 6,266,678 B1 | | 7/2001 | McDevitt et al. |
| 6,281,614 B1 | | 8/2001 | Hill |
| 6,285,105 B1 | | 9/2001 | Asao et al. |
| 6,291,918 B1 | | 9/2001 | Umeda et al. |
| 6,333,573 B1 | | 12/2001 | Nakamura |
| 6,335,583 B1 | | 1/2002 | Kusase et al. |
| 6,337,530 B1 | | 1/2002 | Nakamura et al. |
| 6,348,750 B1 | | 2/2002 | Taji et al. |
| 6,373,164 B1 | * | 4/2002 | Nishimura .................. 310/207 |
| 6,407,476 B1 | | 6/2002 | Nishimura |
| 6,484,388 B1 | | 11/2002 | Amlec et al. |
| 6,501,204 B1 | | 12/2002 | Oohashi et al. |
| 6,501,205 B1 | | 12/2002 | Asao et al. |
| 6,504,283 B1 | | 1/2003 | Asao et al. |
| 6,552,463 B2 | | 4/2003 | Oohashi et al. |
| 6,570,289 B1 | | 5/2003 | Liang et al. |
| 6,573,622 B2 | | 6/2003 | Lim et al. |
| 6,664,703 B2 | | 12/2003 | Oketani et al. |
| 6,742,238 B2 | | 6/2004 | Lee |
| 2001/0011852 A1 | | 8/2001 | Nakamura et al. |
| 2001/0019234 A1 | | 9/2001 | Murakami et al. |
| 2001/0020807 A1 | | 9/2001 | Imori et al. |
| 2001/0024071 A1 | | 9/2001 | Yoshida et al. |
| 2001/0026109 A1 | | 10/2001 | Higashino et al. |
| 2001/0030487 A1 | | 10/2001 | Higashino et al. |
| 2001/0040415 A1 | | 11/2001 | Asao et al. |
| 2001/0040416 A1 | | 11/2001 | Nakamura et al. |
| 2001/0040418 A1 | | 11/2001 | Higashino et al. |
| 2002/0033646 A1 | | 3/2002 | Tanaka et al. |
| 2002/0125784 A1 | | 9/2002 | Bramson et al. |
| 2003/0048032 A1 | | 3/2003 | Brown et al. |
| 2003/0132680 A1 | | 7/2003 | Nakamura et al. |
| 2003/0137204 A1 | | 7/2003 | Neet |
| 2003/0137205 A1 | | 7/2003 | Neet |
| 2003/0137207 A1 | | 7/2003 | Tamura et al. |
| 2003/0173860 A1 | | 9/2003 | Even |
| 2003/0193253 A1 | | 10/2003 | Arimitsu et al. |
| 2004/0145267 A1 | | 7/2004 | Lowry et al. |

* cited by examiner

STATOR OF A ROTARY ELECTRIC MACHINE HAVING STACKED CORE TEETH

CROSS REFERENCE TO RELATED APPLICATION

The present application is a continuation-in-part application corresponding to U.S. patent application Ser. No. 10/899,338 filed on Jul. 26, 2004 entitled "Stator Winding Having Radial Aligned Wraps", which is a continuation-in-part application corresponding to U.S. patent application Ser. No. 10/443,441 filed on May 22, 2003 entitled "Stator Winding Having Cascaded End Loops", which corresponds to Provisional Patent Application Ser. No. 60/454,996, filed on Mar. 14, 2003. entitled "Stator Winding Having Cascade End Loops".

BACKGROUND OF THE INVENTION

The present invention relates generally to electric machines and, in particular, to a stator for an electric machine having a core and a winding. Electric machines, such as alternating current electric generators, or alternators are well known. An automotive alternator is an electric machine which charges the battery of an automotive vehicle. Prior art automotive alternators typically include a stator assembly and a rotor assembly disposed in a alternator housing. The stator assembly is mounted to the housing and includes a generally cylindrically-shaped stator core having a plurality of slots formed therein. The rotor assembly includes a rotor attached to a generally cylindrical shaft that is rotatably mounted in the housing and is coaxial with the stator assembly. The stator assembly includes a plurality of wires wound thereon, forming windings. The stator windings are formed of slot segments that are located in the core slots and end loop segments that connect two adjacent slot segments of each phase and are formed in a predetermined multi-phase (e.g. three, five, or six) winding pattern in the slots of the stator core.

The rotor assembly can be any type of rotor assembly, such as a "claw-pole" rotor assembly, which typically includes opposed poles as part of claw fingers that are positioned around an electrically charged rotor coil. The rotor coil produces a magnetic field in the claw fingers. As a prime mover, such as a steam turbine, a gas turbine, or a drive belt from an automotive internal combustion engine, rotates the rotor assembly, the magnetic field of the rotor assembly passes through the stator windings, inducing an alternating electrical current in the stator windings in a well known manner. The alternating electrical current is then routed from the alternator to a distribution system for consumption by electrical devices or, in the case of an automotive alternator, to a rectifier and then to a charging system for an automobile vehicle including a battery.

One type of device is a high slot fill stator, which is characterized by rectangular shaped conductors whose width, including any insulation fit, closely to the width, including any insulation of the rectangular shaped core slots. High slot fill stators are advantageous because they are efficient and help produce more electrical power per winding than other types of prior art stators. A disadvantage of the high slot fill stators is the difficulty of inserting the wires whose width fits closely to the width of the slots. After the windings have been placed within the core slots, there is a possibility of the winding falling out of the core slots. Sometimes, a varnish is applied to secure the windings within the core slots. The process and tooling required to apply the varnish is complex and adds significant cost to the manufacturing of the core. It is difficult to use tooling to hold the wires in the core slots during the application of the varnish and therefore it is desirable to add a feature to the stator assembly to trap the wires in the core slots prior to the varnish operation it is also well known that the magnetic reluctance in the airgap between the rotor and the stator is proportional to the power output of the electrical machine. The reluctance in the airgap refers to the magnetic resistance that the magnetic field encounters when crossing the gap from the rotor and stator. Increasing the amount of core teeth area that overhangs the adjacent rotor pole finger can reduce the reluctance of the gap. Therefore, wider faces on the ends of the core teeth reduce the magnetic reluctance in the air gap and increase the power density of the machine.

It is also known that there is a substantial amount of power loss on the surface of the pole fingers due to eddy currents passing through the steel causing heat. These eddy currents are generated by variations in induced voltages in the steel caused by flux density variations and changes on the pole surface as it rotates under the stator core teeth. Wider core teeth help to reduce the amount of flux density variation on the pole finger face and, therefore, result in lower power loss due to eddy currents. Therefore, wider faces on the ends of the core teeth reduce the eddy current losses on the pole finger faces.

It is desirable, therefore, to provide a stator assembly that meets the requirements of a high slot fill stator including conductors having slot segments with a width, including any insulation, that closely fits to the width, including any insulation, of the core slot, and being radially inserted into a cylindrically-shaped core and being secured therein.

SUMMARY OF THE INVENTION

A stator for a dynamoelectric machine according to the present invention includes a generally cylindrically-shaped stator core having a plurality of circumferentially spaced and axially-extending core teeth that define a plurality of circumferentially spaced and axially-extending core slots in a surface thereof. The core slots extend between a first and a second end of the stator core. The stator also includes a multi-phase stator winding. Each of the phases includes a plurality of slot segments disposed in the core slots that are alternately connected at the first and second ends of the stator core by a plurality of end loop segments. The slot segments and likely the end loop segments of a high slot fill winding are typically rectangular in cross sectional shape, however round, oval, triangular and other cross sectional shapes may be used. The end loop segments of the winding may be interlaced or cascaded. An interlaced winding includes a majority of end loops that connect a slot segment housed in one core slot and in one radial position with a slot segment housed in another core slot in a different radial position. The term radial position, utilized herein, refers to the position of a slot segment housed in the core slots with respect to the other slot segments housed in the same core slot—i.e. the outermost slot segment housed in a core slot is defined as being located in the outermost radial position, the second outermost slot segment housed in a slot is defined as being located in the second outermost radial position, and so forth. A cascaded winding includes a majority of end loop segments which connect a slot segment housed in one radial position of a core slot with another slot segment housed in the same radial position of another core slot. The term phase portion, utilized herein, is defined as a portion of a conductor of a phase having at least three consecutive slot segments connected by at least two end loop segments and a phase portion is further defined by its slot segments being housed in a particular radial position—i.e. a phase portion of a phase having slot segments housed in the outermost radial position is defined as an outermost phase portion of the phase. A cascaded winding also includes, for the phase portions of all of phases located in the same general circumferential location, radial alignment of all of the phase portions which have slot segments located in the same radial position, which allows for sequential radial insertion of these phase portions for each phase—i.e. for the outermost phase portions of all of phases located in the same general circumferential location, an outermost phase portion of one phase could be completely radially inserted into the core slots prior to an outermost phase portion of a second phase, which could be completely radially inserted into the core slots prior to an outermost phase portion of a third phase and so forth. A cascaded winding also includes, for the phase portions of all of phase located in the same general circumferential location, radial alignment of all of the groups of phase portions wherein each group of phase portions includes all of the phase portions having slot segments located at a particular radial position, which allows for sequential radial insertion for all of these groups of phase portions—i.e. for the phase portions of all of phase located in the same general circumferential location, the outermost phase portion of all of the phases could be radially inserted into the core slots prior to the second outermost phase portion of all of the phases, which could be radially inserted prior to the third outermost phase portion of all of the phases and so forth.

A cascaded winding increases the potential for the slot segment to fall out of a core slot compared to the interlaced winding because the cascaded winding has a slot segment housed in one core slot located at the innermost radial position, connected to an end loop segment which is located radially inward of all other end loop segments and which is connected to another slot segment housed in another core slot also located in the innermost radial position. Therefore, the slot segments housed in the core slots located at the innermost radial position and end loop segments that are connected to these slot segments are free to move radially inward and the slot segments can therefore potentially fall out of the core slots. In contrast, the interlaced winding has each slot segment housed in a core slot located in the innermost radial position connected to an end loop segment which bends outward to be located radially outward of other end loop segments and which is connected to a slot segment housed in another core slot located in the second innermost radial position. Therefore each slot segment located in the innermost radial position is connected to an end loop segment and another slot segment which are held outward by other end loop segments and other slot segments thereby minimizing the chance that the slot segment located at the innermost radial position will fall out of the slot.

The distal end of at least one of the core teeth is staked such that the distal end of the staked core tooth is flared outward circumferentially to secure the stator winding within the core slot.

The typical process is to insert the winding into the core slots and then stake the distal end of at least one of the core teeth to secure the winding therein. For the continuous winding, cascaded or interlaced, the slot segments of the winding are desired to be substantially radially inserted from the inner diameter of the stator core through the slot opening to a final position of being housed into the insulated slots.

The design of the stator assembly along with the process of radial insertion of the windings and staking of the core teeth in accordance with the present invention advantageously eliminates the potential of the winding falling out of the slots.

In a second aspect of the present invention. The distal ends of at least the majority of core teeth are staked along a substantial length of each core tooth so that they flare outwardly. In this way, the end of the core teeth are substantially widened, reducing the reluctance of the airgap between the rotor and stator by increasing the surface area of the distal ends of the core teeth. The increase in area of teeth provides a larger area for the flux to enter into the core teeth from the rotor pole finger face resulting in an increase in the machine's power density. In addition, the wider surface area of the core teeth effectively spreads out the flux field concentrated on the rotor pole surface, resulting in a lower variations in flux density on the pole surface. It is well known that the variation in flux density on the pole surface contributes to eddy current losses. Eddy currents are generated by changes in the flux density on a given surface resulting in variations in generated voltages at different points on the surface. Wider core teeth help to more evenly distribute the flux on the rotor pole finger, resulting in less eddy current loss. This reduction in losses reduces the heat generated by machine losses and improves the efficiency of the device.

DESCRIPTION OF THE DRAWINGS

The above, as well as other advantages of the present invention, will become readily apparent to those skilled in the art from the following detailed description of a preferred embodiment when considered in the light of the accompanying drawings in which.

Figure 9:
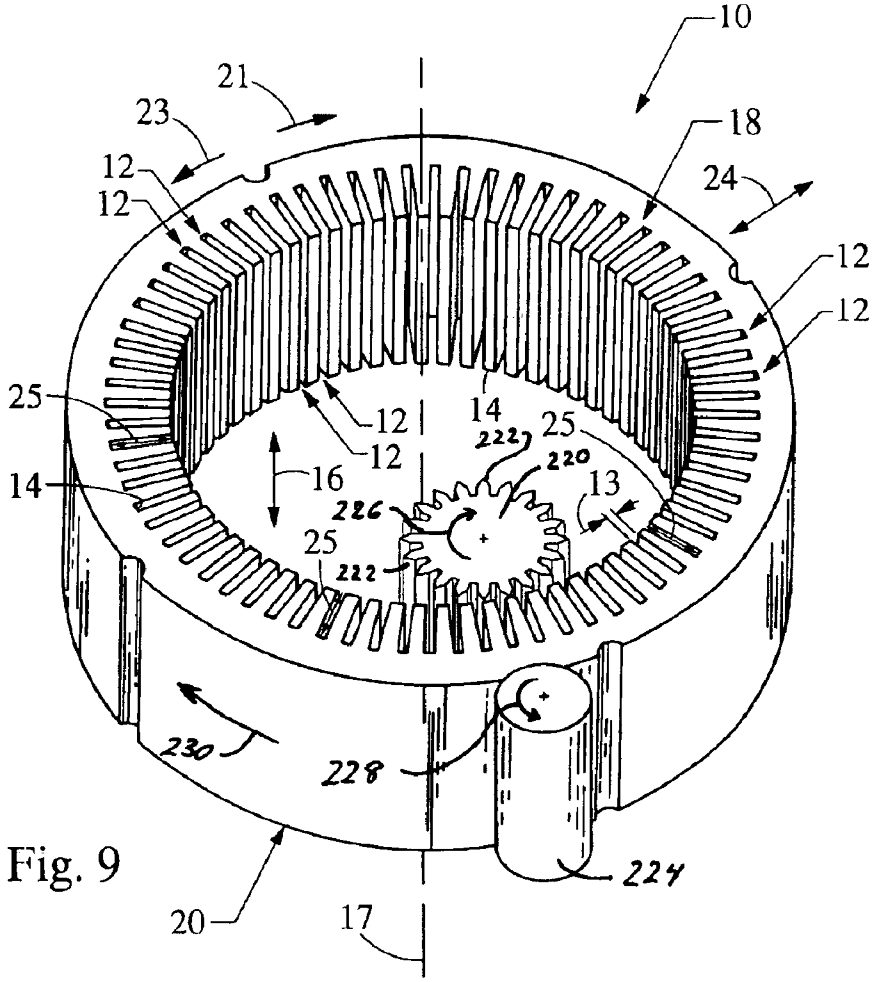
Figure 8:
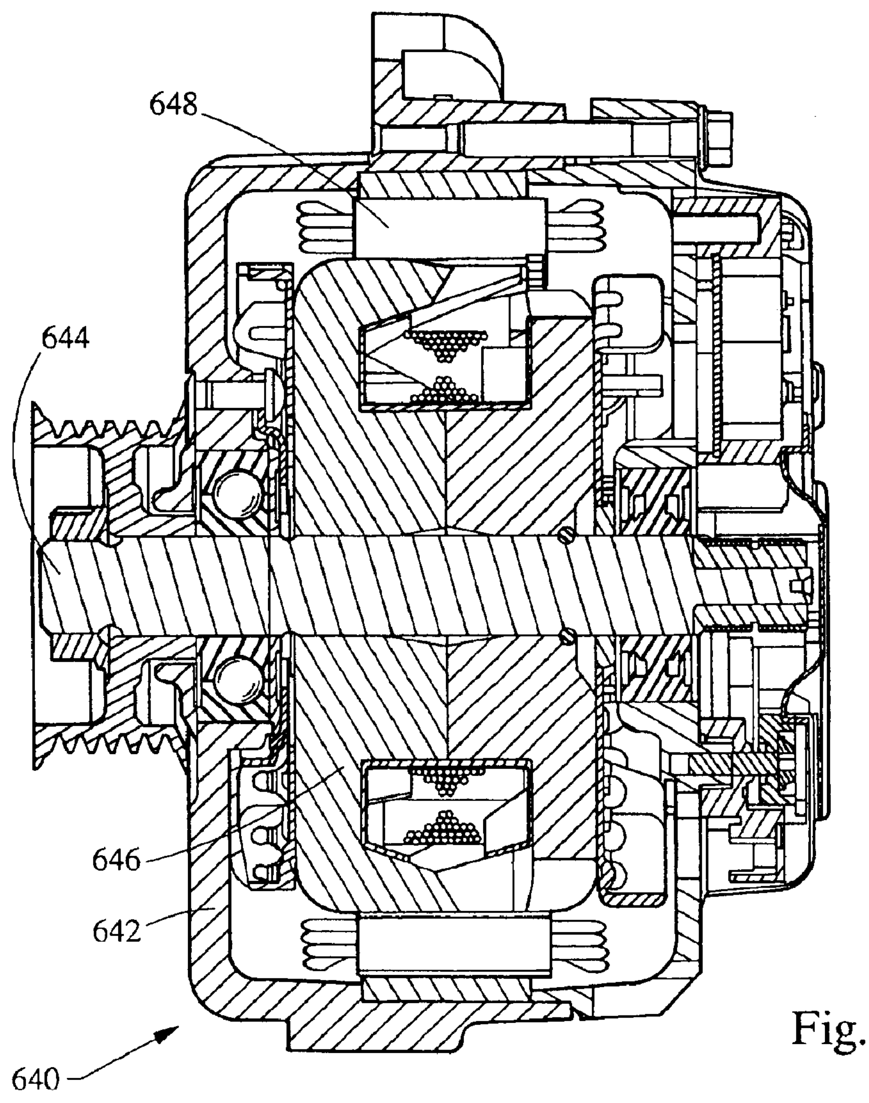

FIG. 8 is a cross sectional view of an alternator in accordance with the present invention; and FIG. 9 is a perspective view of the stator core illustrating how tooling forms the stakes in the distal ends of the core teeth.

DESCRIPTION OF THE EMBODIMENTS

Figure 1:
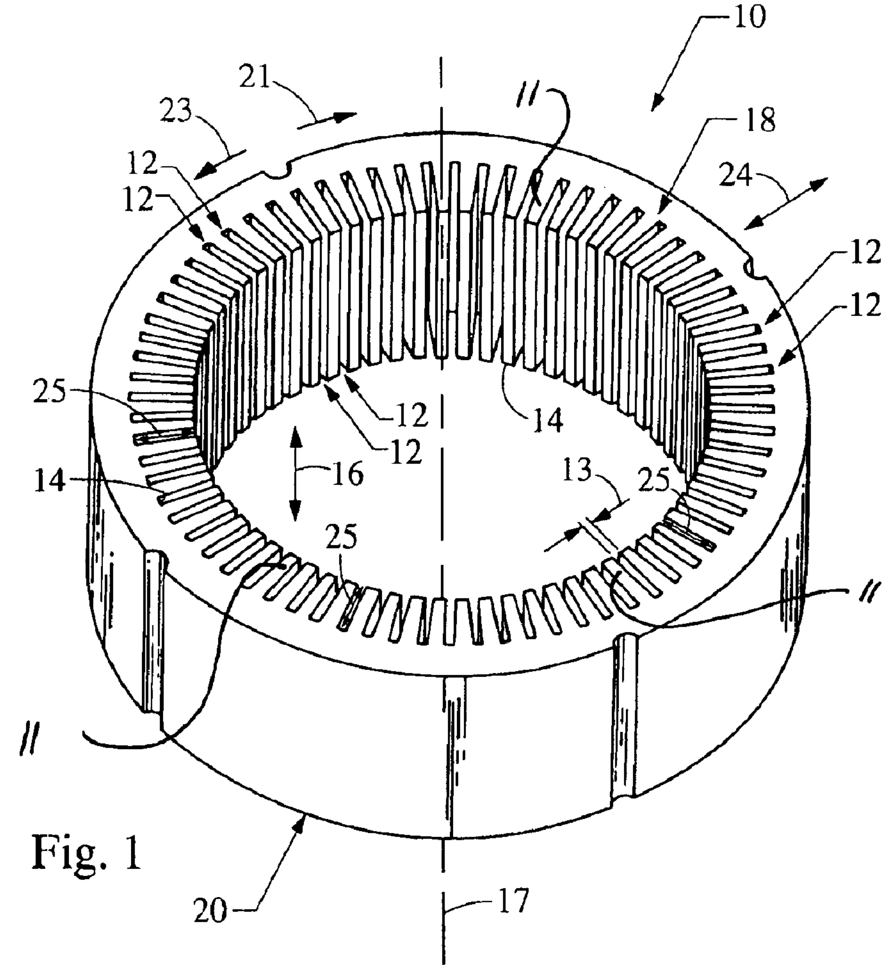
FIG. 1 is a perspective view of a stator core in accordance with the present invention prior to insertion of the stator winding.

Referring now to FIG. 1, a generally cylindrically-shaped stator core is indicated generally at 10. The stator core 10 includes a plurality of core teeth 11 that define a plurality of core slots 12 formed in a circumferential interior surface 14 thereof. The core slots 12 extend in an axial direction, indicated by an arrow 16, parallel to the central axis 17 of the stator core 10 between a first end 18 and a second end 20 thereof. An axially upward direction is defined as moving toward the first end 18 of the stator core 10 and an axially downward direction is defined as moving toward the second end 20 of the stator core 10. Preferably, the core slots 12 are equally spaced around the circumferential inner surface 14 of the stator core 10 and the respective inner surfaces 14 of the core slots 12 are substantially parallel to the central axis 17. However, as an alternative, the core slots 12 can be unequally spaced around inner surface 14. A circumferential clockwise direction is indicated by an arrow 21 and a circumferential counterclockwise direction is indicated by an arrow 23.

The core slots 12 define a radial depth 25 along a radial direction, indicated by an arrow 24, and are adapted to receive a stator winding, discussed in more detail below. A radial inward direction is defined as moving towards the central axis 17 of the stator core 10 and a radial outward direction is defined as moving away from the central axis 17. The core slots 12 may have a rectangular cross sectional shape as can be seen in FIG. 1.

Figure 2:
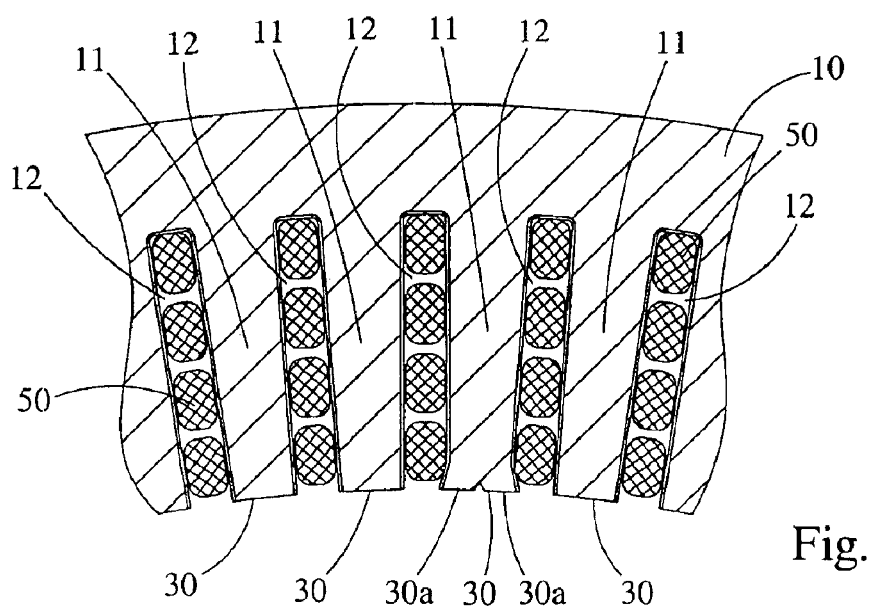
FIG. 2 is a cross sectional view of a portion of the stator core after insertion of the stator winding wherein one of the core teeth is staked in accordance with the present invention.

Referring to FIG. 2, each of the core teeth 11 of the stator core 10 has a distal end 30. A stator winding 50 is positioned within the core slots 12. The distal end 30 of at least one of the core teeth 11 is staked such that portions 30*a* of the distal end 30 of the core tooth 11 flare outward to secure the stator winding 50 within the core slots 12. In one embodiment, a few of the core teeth 11 are staked, as shown in FIG. 2. In this embodiment, the core teeth 11 adjacent the conductor leads of the winding 50 is staked, because the leads have the greatest propensity to fall out of the core slots 12. As can be seen in FIG. 2, the slot segments are typically aligned in one radial row in each core slot.

Figure 3:
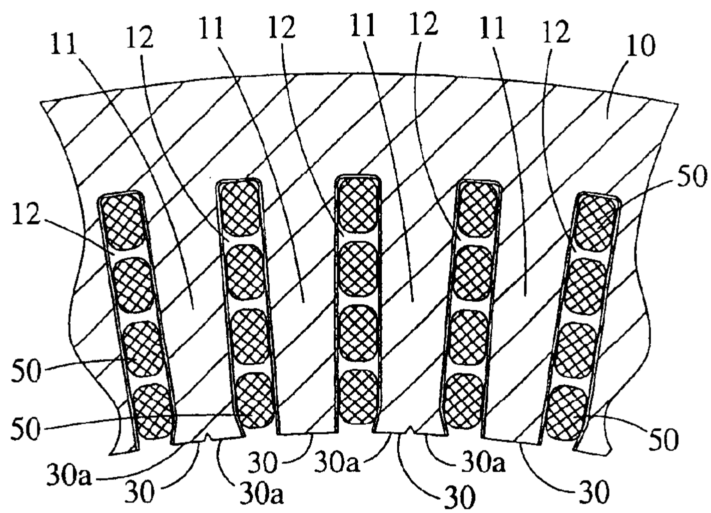
FIG. 3 is a cross sectional view similar to FIG. 2 wherein every other core tooth has been staked in accordance with the present invention.
Figure 4A:
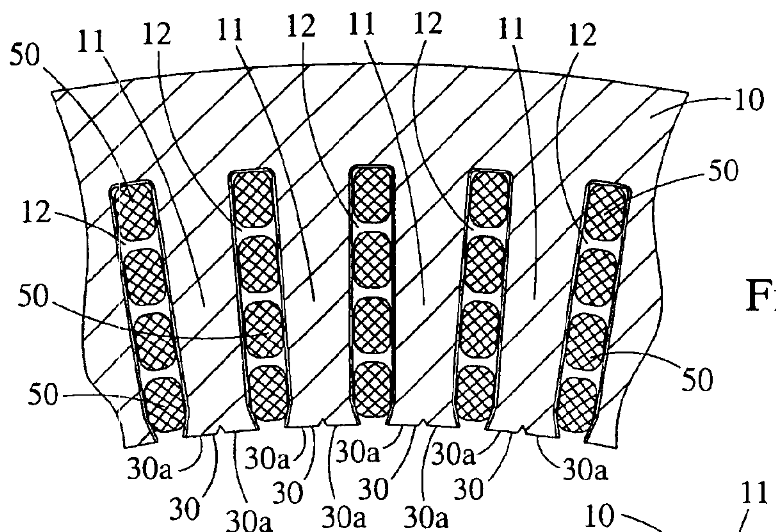
FIG. 4*a* is a cross sectional view similar to FIG. 2 wherein every core tooth has been staked in accordance with the present invention.

In FIG. 3 a stator core 10 is shown wherein every other core tooth 11 is staked to further secure the winding 50 within the core slots 12. FIG. 4*a* illustrates and embodiment wherein each core tooth 11 is staked. The staking of the core teeth 11 will secure the winding 50 within the stator core 10 until the winding 50 can be varnished by conventional methods. By staking the core teeth 11, the need for tooling to hold the winding 50 in place during the varnish process is eliminated, thereby simplifying the varnishing process.

Figure 4B:
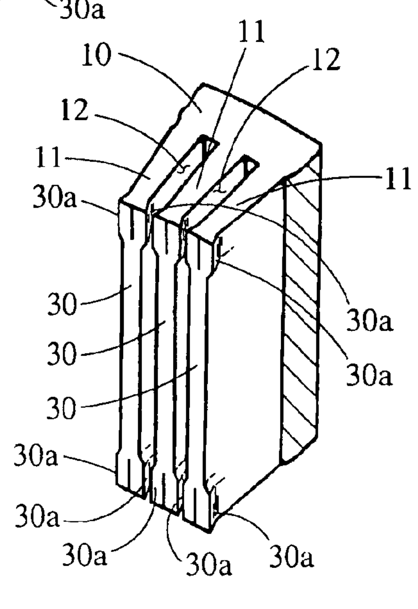
FIG. 4*b* is a perspective view of a portion of the stator core shown in FIG. 4*a* wherein the core teeth are staked only adjacent the first and second ends of the stator core.

Referring to FIG. 4*b*, a perspective view shows that the core teeth 11 are staked only near the first and second ends 18, 20 of the stator core 10. This makes the staking process easier by allowing smaller staking tooling to be used. In order to stake the core teeth 11 along the entire axial length of the stator core 10, the tooling would have to be at least as large as the length of the stator core 10. Further, the force required to create a stake along the entire length of the stator core 10 would be much higher than is required to create a small stake adjacent the first and second ends 18, 20.

Figure 4C:
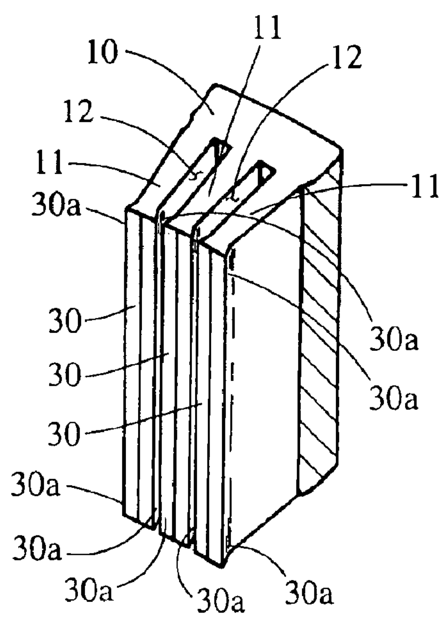
FIG. 4*c* is a perspective view of a portion of the stator core shown in FIG. 4*a* wherein the core teeth are staked along an entire axial length of the of the stator core.

Referring to FIG. 4*c*, a perspective view of an embodiment is shown wherein the core teeth 11 are staked for the majority of the length of the stator core 10. In this way, the effective area of the ends of the core teeth is substantially increased, reducing the magnetic reluctance in the airgap ## (add a number to FIG. 8) shown in FIG. 8. In addition, the flux density on the surface of pole faces ##, shown in FIG. 9, are reduced. This results in a reduction of eddy current losses on the rotor pole faces.

Figure 7:
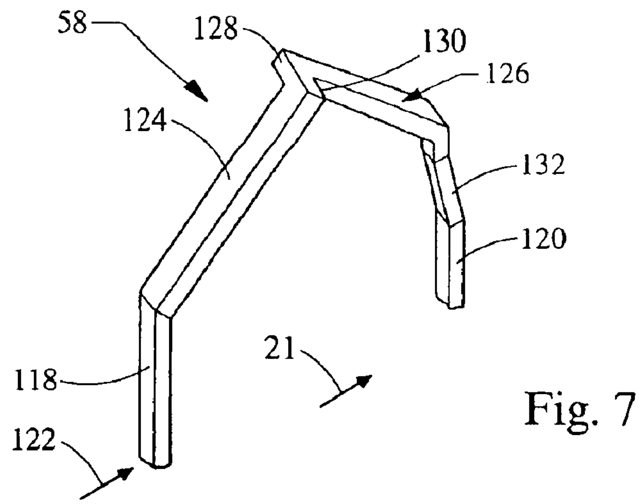
FIG. 7 is a perspective view of an end loop segment of a portion of a stator winding in accordance with the present invention.
Figure 7A:
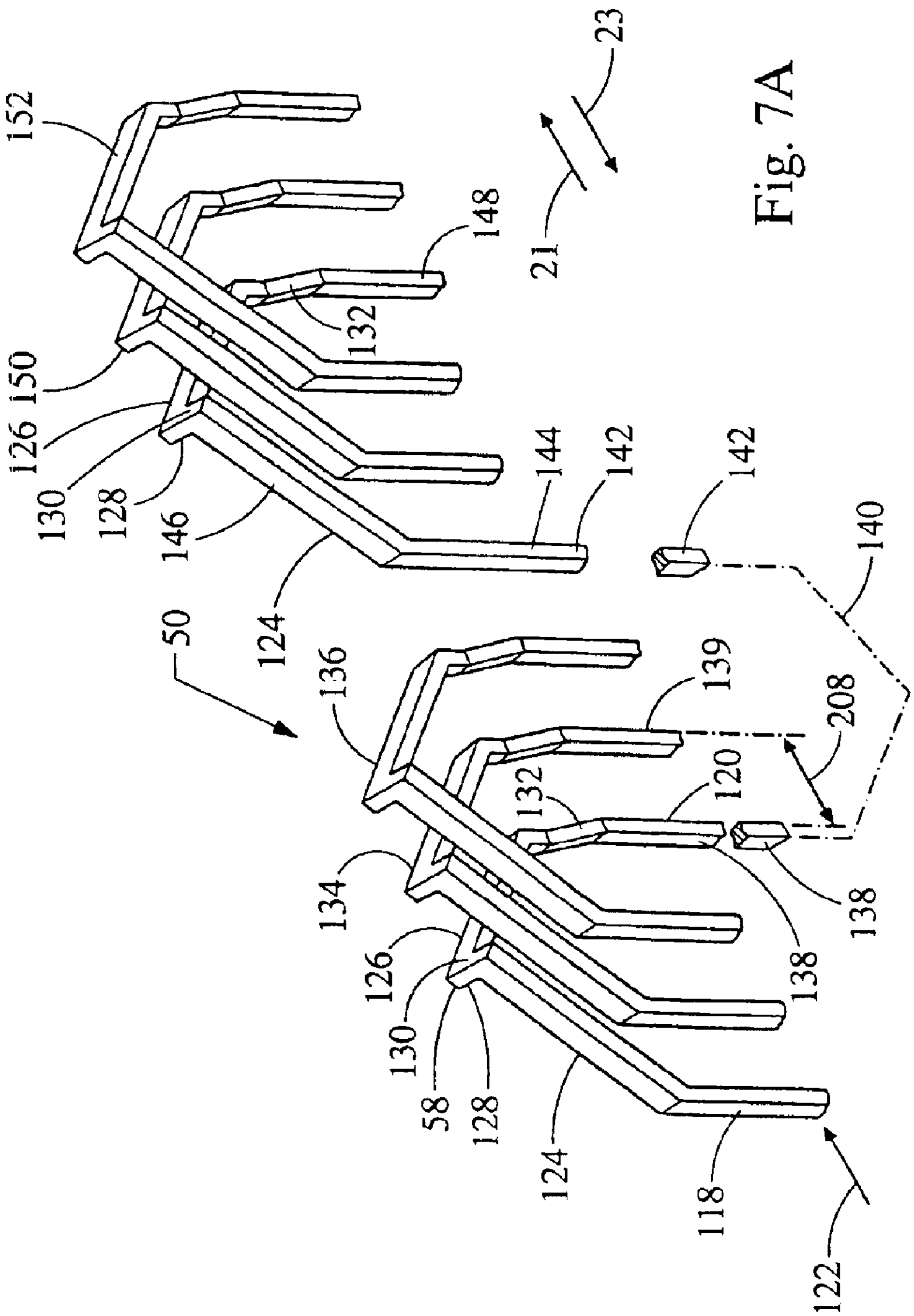
FIG. 7*a* is a perspective view of a layer of end loop segments of a portion of a stator winding in accordance with the present invention including the end loop segment of FIG. 7.
Figure 7B:
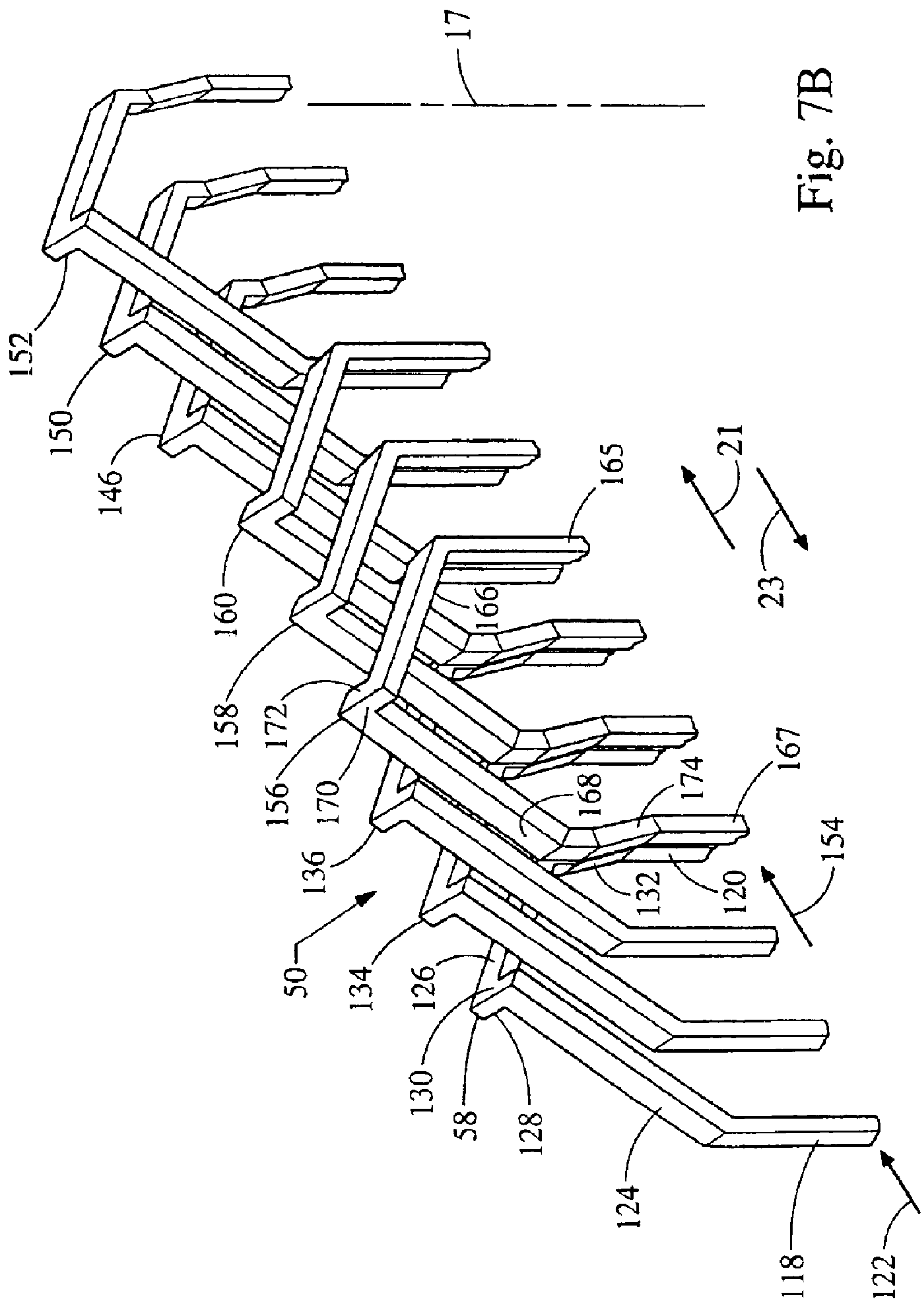
FIG. 7*b* is a perspective view of a plurality of layers of end loop segments of a stator winding in accordance with the present invention including the layer of FIG. 7*a;*
Figure 7C:
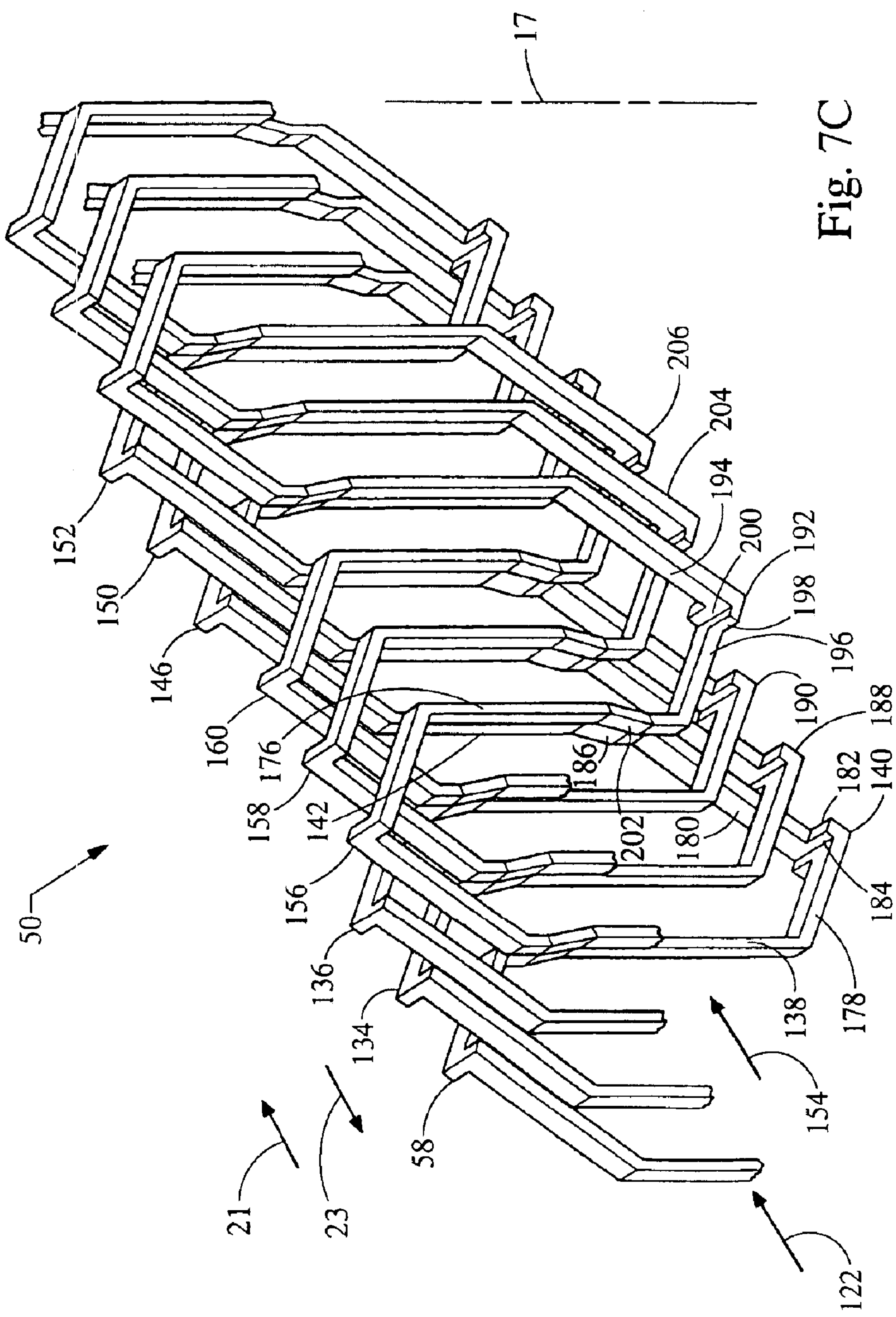
FIG. 7*c* is a perspective view of a plurality of layers of end loop segments of the stator winding shown in FIG. 7*b* including a plurality of slot segments and end loop segments in accordance with the present invention.

The cascaded winding for the stator is shown in FIGS. 7 through 7*c*. Each of the continuous conductors have a plurality of slot segments disposed in the core slots 12. The term continuous, utilized herein, refers to a conductor including at least two end loop segments connected to at least three slot segments that extends circumferentially around the core without any welds or connections. The slot segments are alternately connected at the first and second ends 18, 20 of the stator core 10 by a plurality of end loop segments. Each of the slot segments of a particular layer are substantially the same radial distance from a central axis 17 of the stator core 10 and the end loop segments form a cascaded winding pattern. The term layer, utilized herein, refers to a conductor which extends circumferentially around the core including at least two end loop segments which connect at least three slot segments wherein the slot segments are located in the same radial position.

Figure 5:
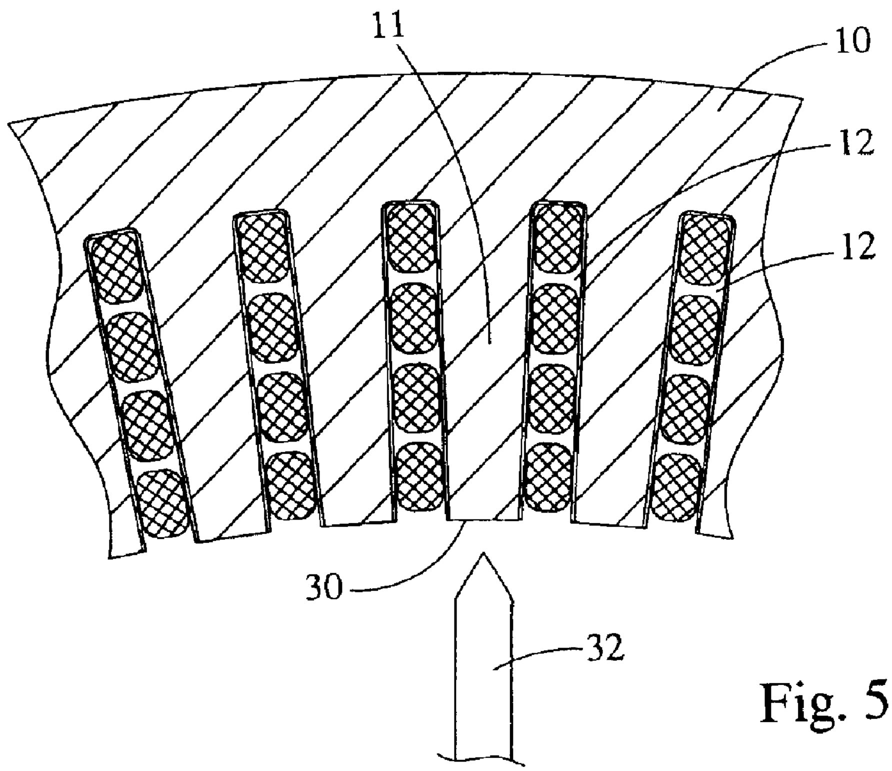
FIG. 5 is a cross sectional view similar to FIG. 2 prior to staking of the core tooth showing how the tooling moves in to stake the distal end of the core tooth.
Figure 6:
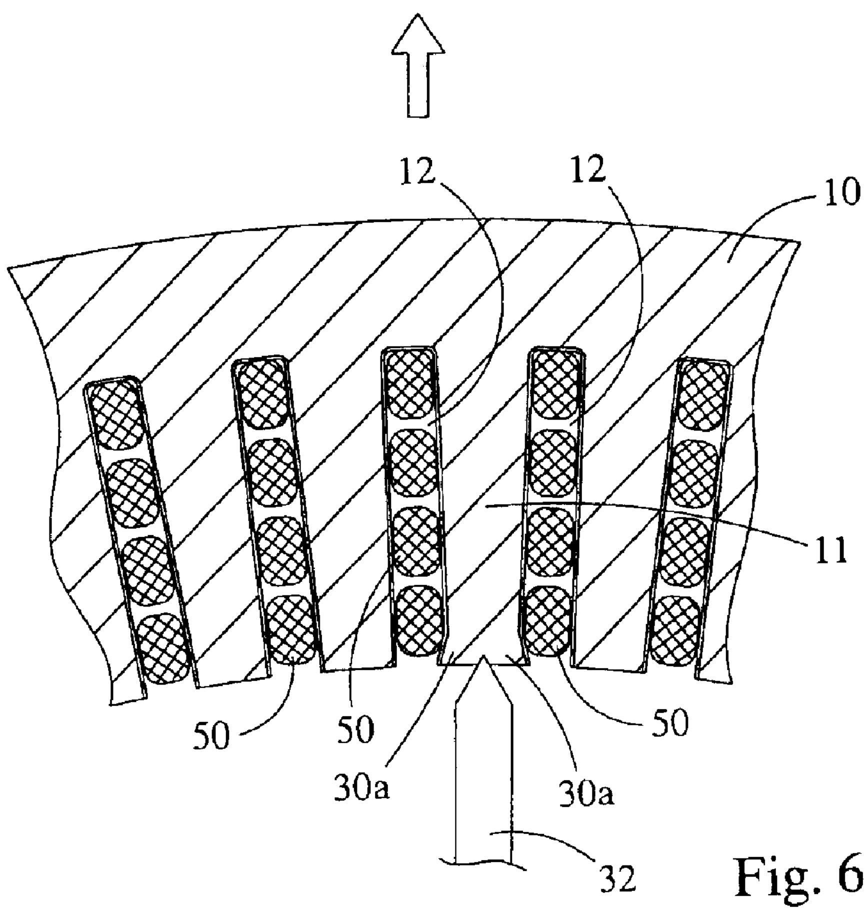
FIG. 6 is cross sectional view similar to FIG. 5 showing the tooling engage the distal end of the core tooth to form the stake therein.

In the first embodiment, when forming the stator, the windings 50 are placed within the stator core 10 and tooling 32 is brought into contact with the distal end 30 of the core tooth 11 as shown in FIG. 5. Referring to FIG. 6, once the tooling 32 contacts the distal end 30 of the core tooth 11, additional force pushes the tooling 32 into the distal end 30 of the core tooth 11 forcing portions 30*a* of the distal end 30 of the core tooth 11 to flare outward. The flared portions 30*a* reduce the opening width of the core slot 12 to a size smaller than the width of the slot segments housed in the same core slot 12 such that the windings 50 cannot fall out of the core slots 12.

In the second embodiment of the present invention, windings 50 are placed within that stator core 10 and tooling 32 that extends a substantial length of the stator core 10 is brought into contact with the ends of core teeth 11 as shown in FIG. 5. Referring to FIG. 6, once the tooling 32 contacts the end 30 of the core tooth 11, additional force pushes the tooling 32 into the distal end 30 of the core tooth 11 forcing portions 30*a* of the end 30 of the core tooth 1 1 to flare outward. The flared portions 30*a* reduce the opening width of the core slot 12 to a size smaller than the width of the slot segments housed in the same core slot 12 such that the windings 50 cannot fall out of the core slots 12.

As an alternative, the tooling 32 could be replaced with a roller-type tool 220 as shown in FIG. 9, that contains a plurality of protrusions 222. The roller-type tool 220 is inserted into the inside diameter of stator core 10 after the windings 50 are placed in the core slots 12. The roller-type tool 220 is then actuated forward such that the protrusions 222 contact the ends 30 of the core teeth 11. Additional force is applied to the roller-type tool 220 to force the protrusions 222 into the ends 30 of the core teeth 11, thereby forming flared portions 30*a* on the ends 30 of the core teeth 11. The stator core 10 is then rolled between the roller-type tool 220 on the inside diameter of the core 10 and a support roller 224 on the outside of the core 10, as shown in FIG. 9, causing each core tooth 11 to be deformed by the protrusions 222 on the roller-type tool 220. Both the roller-type tool 220 and the support tool 224 rotate in the direction shown by arrows 226, 228 as the core 10 is rotated as shown by arrow 230.

Referring now to FIG. 7, the end loop segment, indicated generally at 58, is adapted to be a part of the stator winding and includes a first substantially straight end portion 118 and a second substantially straight end portion 120 that are each proximate to a respective slot segment, discussed in more detail below, of the stator winding. The first end portion 118 and the second end portion 120 of the end loop segment 58 are at a substantially same radial distance from the central axis 17 of the stator core 20. The first end portion 118 and the second end portion 120 form a portion of a layer, indicated generally at 122, of the stator winding whose slot segments are located in the same radial position in the core slots 12. Although end portions, such as 118 and 120, are described as entities, they may, in fact, just be portions of the slot segments, discussed in more detail below.

The end loop segment 58 includes a first sloped portion 124 and a second sloped portion 126 that meet at an apex portion 128. The first sloped portion 124 is substantially co-radial with the slot segments of layer 122, the first end portion 118 and the second end portion 120. The second sloped portion 126 is substantially non-co-radial with the slot segments of layer 122, the first end portion 118 and the second end portion 120. The apex portion 128 includes a first radial extension portion 130. The first radial extension portion 130 extends from the first sloped portion 124 in the radially outward direction, which provides a radial outward adjustment for the end loop segment 58. A second radial extension portion 132 connects the second sloped portion 126 and the second end portion 120. The second radial extension portion 132 extends from the second sloped portion 126 in the radially inward direction, which provides a radial inward adjustment for the end loop segment 58. Although the radial extension portions, such as 130 and 132, shown in FIGS. 7, 7*a*, 7*b*, and 7*c* appear as sharp bends, it is obvious to those skilled in the art that typical radial extension portions would be gentler in nature and include radii, not shown.

While the end loop segment 58 has been shown wherein the radial outward adjustment is adjacent the apex portion 128 and the radial inward adjustment is adjacent the second sloped portion 126, those skilled in the art can appreciate that the radial outward and inward adjustments can be on any one or on any two of the first sloped portion 124, the second sloped portion 126, and the apex portion 128 in order to provide the cascaded winding pattern, described in more detail below.

Referring now to FIG. 7*a*, the end loop segment 58 of FIG. 7 is shown adjacent a plurality of substantially identical end loop segments, indicated generally at 134 and 136. The end loop segments 58, 134, and 136 each form a portion of the layer 122 of the stator winding, indicated generally at 50. The end loop segments 58, 134, and 136 are shown in a three-phase winding pattern but those skilled in the art will appreciate that the end loop segments 58, 134, and 136 may be formed in, for example, a six-phase winding pattern, or any other winding pattern advantageous for producing electricity or for generating torque, as in the case of an electric motor. In a three-phase winding the end loop segments have a pitch equal to three as can be best seen in FIG. 7*a* where end loop segment 140 connects a slot segment 138 disposed in a first core slot with another slot segment 142 disposed in a core slot which is located three core slots from the first core slot. The end loop segments 58, 134, and 136 are preferably each disposed at the first end 18 of the stator core 10.

The portion 120 attaches to a first slot segment, shown schematically as 138, which extends through a one of the core slots 12 to the second end 20 of the stator core 10. As the first slot segment 138 exits the second end 20, the first slot segment 138 is attached to an end of another end loop segment, shown schematically at 140, which is described in more detail below. The end loop segment 140 is attached at another end to a second slot segment, shown schematically at 142. The second slot segment 142 extends upwardly through another one of the core slots 12 of the stator core 10 and attaches to a portion 144 of an end loop segment 146, which is substantially identical to the end loop segments 58, 134, and 136. Similarly, a portion 148 of the end loop segment 146 connects to another slot segment, discussed in more detail below. The pattern of connecting end loop segments 58,140, and 146 and slot segments, such as the slot segments 138 and 142, as outlined above, continues about the circumference of the stator core 10 to form a first layer, such as the layer 122, of a single phase of the stator winding 50.

The end loop segment 146 is shown adjacent a plurality of substantially identical end loop segments, indicated generally at 150 and 152. The end loop segments 146, 150, and 152 are each connected to a corresponding plurality of slot segments, discussed in more detail below, such as the slot segment 142, which are each disposed in a respective core slot 12 of the stator core 10. The slot segments are attached to a plurality of end loop segments, discussed in more detail below. The end loop segments 134, 136, 150, and 152, when attached to the slot segments and end loop segments, each form a respective continuous first layer of the complete stator winding 50 that is wound about the circumference of the stator core 10.

Preferably, each of the slot segments 138 and 142 and each of the end loop segment 58, 134, 136, 140, 146, 150, and 152 are formed from a rectangular wire and have a cross-sectional shape having a substantially constant circumferential width and radial width and therefore substantially equal area, however, other shapes could also be employed such as round, triangular or elliptical. For those skilled in the art, it is known that a square shaped conductor is considered a type of a rectangular shaped conductor and that a typical rectangular conductor may include radii on the corners intermediate two adjacent edges. It should also be understood that the conductors can be manufactured using continuous wire or wire segments.

Referring now to FIGS. 7*b* and 7*c*, the first layer 122 of the end loop segments 58, 134, 136, 146, 150, and 152 of FIG. 7*a*, is shown with a second layer of end loop segments indicated generally as 154. The layer 154 is located radially inward of the layer 122 at a predetermined radial distance from the layer 122. The second layer 154 includes a plurality of end loop segments, indicated generally at 156, 158, and 160. The layers 122 and 154 together form a portion of the stator winding 50. The conductor of the second layer 154 including the end loop segment 156 is similar to the conductor of the first layer 122 including the end loop segment 58 except that it is inserted into the core slots 12, shifted by a predetermined number of slots, discussed in more detail below, and it has end loop segments on a first end 18 of the stator core 10, such as the end loop segment 156, that extend radially outwardly at the apex portion 170 in the counterclockwise direction 162, which is opposite the end loop segments, such as the end loop segment 58, of the first layer 122, which extend radially outwardly at the apex portion 128 in the clockwise direction 164.

The end loop segment 156 includes a first sloped portion 166 and a second sloped portion 168 connected by an apex portion 170. The first sloped portion 166 is substantially co-radial with the slot segments of the second layer 154, the first end portion 165 and the second end portion 167. The second sloped portion 168 is substantially non-co-radial with the slot segments of the second layer 154, the first end portion 165 and the second end portion 167. The apex portion 170 includes a first radial extension portion 172. The first radial extension portion 172 extends from the first sloped portion 166 in the radially outward direction, which provides a radial outward adjustment for the end loop segment 156. A second radial extension portion 174 connects the second sloped portion 168 and the second end portion 167. The second radial extension portion 174 extends from the second sloped portion 168 in the radially inward direction, which provides a radial inward adjustment for the end loop segment 156.

As can best be seen in FIG. 7*b*, the non-co-radial portion 168 of end loop segment 156 extends radially outward where it becomes substantially co-radial with the slot segments of the first layer 122, the first end portion 118 and the second end portion 120, but because it is shifted by a predetermined number of slots, it does not violate the space of the end loop segments of the first layer 122. This allows the end loop segments of the two layers, 122 and 154 to cascaded together forming a two layer winding 50, which extends radially outward by one substantial wire width beyond the first layer 122 but does not substantially extend radially inward beyond the innermost layer 154.

For a winding with a plurality of layers, a third layer (not shown) which is substantially identical to the first layer 122, would have non-co-radial portions that would extend radially outward and be substantially co-radial with the slot segments of the second layer 154 and therefore cascade with the second layer 154. For a pattern where the radial layers alternate between being substantially identical with the first layer 122 and the second layer 154, a pattern develops where the winding 50 only extends radially outward by one wire width for the outermost layer 122 but not radially inward of the innermost layer. This cascading effect allows a winding 50 with a plurality of layers to be inserted into a stator core 10, that extend radially outwardly by one substantial wire width while not extending radially inwardly. The end loop segments 158 and 160 are substantially identical to the end loop segment 156. The radial outward and inward adjustments for the layers 122, 154 form a cascaded winding pattern shown in FIGS. 7*b* and 7*c*.

Referring to FIG. 7*c*, the first layer 122 and the second layer 154 are shown with a plurality of slot segments 176, which are substantially identical to the slot segments 138 and 142. The end loop segment 140 of FIG. 7*a* is shown having a first sloped portion 178 and a second sloped portion 180 connected by an apex portion 182. The first sloped portion 178 is substantially co-radial with the slot segments 138 and 142 of the first layer 122 . The second sloped portion 180 is substantially non-co-radial with the slot segments 138 and 142 of the first layer 122. The apex portion 182 includes a first radial extension portion 184. The first radial extension portion 184 extends from the first sloped portion 178 in the radially outward direction, which provides a radial outward adjustment for the end loop segment 140. A second radial extension portion 186 connects the second sloped portion 180 and the slot segment 142. The second radial extension portion 186 extends from the second sloped portion 180 in the radially inward direction, which provides a radial inward adjustment for the end loop segment 140. The end loop segments 188 and 190 are substantially identical to the end loop segment 140.

Similarly, an end loop segment 192 of the second layer 154 is shown adjacent the end loop segment 190 of the first layer 122. The end loop segment 192 includes a first sloped portion 194 and a second sloped portion 196 connected by an apex portion 198. The first sloped portion 194 is substantially co-radial with the the slot segments 176 of the second layer 154. The second sloped portion 196 is substantially non-co-radial with the slot segments 176 of the second layer 154. The apex portion 198 includes a first radial extension portion 200. The first radial extension portion 200 extends from the first sloped portion 194 in the radially outward direction, which provides a radial outward adjustment for the end loop segment 192. A second radial extension portion 202 connects the second sloped portion 196 and the slot segment 176. The second radial extension portion 202 extends from the second sloped portion 196 in the radially inward direction, which provides a radial inward adjustment for the end loop segment 192. The end loop segments 204 and 206 are substantially identical to the end loop segment 192.

The slot segments, such as 138, 142, and 176, of each phase of the stator winding 50 are preferably disposed in respective core slots 12 at an equal slot pitch around the circumference of the stator core 10. Specifically, a slot segment of a phase, such as the slot segment 138, is disposed in a respective core slot 12 adjacent a slot segment 139 of the adjacent phase. The respective slot segments 138 and 139 are spaced apart by a circumferential distance or slot pitch 208, best seen in FIG. 7*a*. The circumferential slot pitch 208 is substantially equal to the circumferential distance between a pair of adjacent core slots 12 in the stator core 20. Each of the slot segments and end loop segments of the phase including the slot segment 138 remain disposed adjacent the respective slot segments and end loop segments of the phase including the slot segment 139 at the same circumferential slot pitch 208 throughout the length of the stator winding 50 and throughout the circumference of the stator core 20.

While the slot segments 176 are shown generally coplanar in FIGS. 7*b* and 7*c* for illustrative purposes, the slot segments 176 are preferably adapted to be received by a radially curved surface, such as the interior surface of the stator core 10 and, therefore, are not coplanar but are co-radial. The width of each of the slot segments 176, including any insulation, preferably fits closely to the width of the core slots 12, including any insulation.

Referring now to FIG. 8, a dynamoelectric machine in accordance with the present invention is indicated generally at 640. The dynamoelectric machine is preferably an alternator, but those skilled in the art will appreciate that the dynamoelectric machine can be, but is not limited to, an electric motor, a starter-generator, or the like. The dynamoelectric machine 640 includes a housing 642 having a shaft 644 rotatably supported by the housing 642. A rotor assembly 646 is supported by and adapted to rotate with the shaft 644. The rotor assembly can be, but is not limited to, a "claw pole" rotor, a permanent magnet non claw pale rotor, a permanent magnet claw pole rotor, a salient field wound rotor or an induction type rotor. A stator assembly 648 is fixedly disposed in the housing 642 adjacent the rotor assembly 646. The stator assembly 648 includes a stator core, such as the stator core 10 and a winding, such as the stator winding 50.

In accordance with the provisions of the patent statutes, the present invention has been described in what is considered to represent its preferred embodiment. However, it should be noted that the invention can be practiced otherwise than as specifically illustrated and described.

What is claimed is:

1. A stator for an automotive alternator, comprising:

a generally cylindrically-shaped stator core having a plurality of circumferentially spaced and axially-extending core teeth that define a plurality of circumferentially spaced and axially-extending core slots in a surface thereof, said core slots extending between a first and a second end of said stator core;

a stator winding having a plurality of phases, each of said phases including at least one conductor having a plurality of slot segments housed in said core slots, said slot segments alternately connected at said first and second ends of said stator core by a plurality of end loop segments, and at least one of said core teeth having a distal end that is staked for an axial length that is shorter than the axial length of said stator core, such that the distal end of said at least one core tooth is flared outward circumferentially on at least one side of said distal end to secure said stator winding within said core slots.

2. The stator according to claim 1 wherein at least one of said core teeth is staked for an axial length that substantially the axial length of said stator core.

3. The stator according to claim 1 wherein said at least one of said core teeth is staked adjacent to said first and second ends of said stator core.

4. The stator according to claim 1 wherein the distal end of every other one of said core teeth is staked to secure said stator winding within said core slots.

5. The stator according to claim 1 wherein the distal end of each of said core teeth is staked to secure said stator winding within said core slots.

6. The stator according to claim 1 wherein a varnish is applied to said stator winding to further secure said stator winding within said core slots.

7. The stator according to claim 1 wherein said slot segments are inserted into said core slots of said generally cylindrically-shaped stator core in a substantial radial direction.

8. The stator of claim 1 wherein said winding includes said conductors formed in a cascaded winding.

9. The stator according to claim 1 wherein said slot segments housed in said core slots are aligned in a radial row and have a rectangular cross section.

10. The stator according to claim 1 wherein a width of said slot segments, including any insulation, fits closely to the width of said core slots, including any insulation.

11. The stator according to claim 1 wherein at least one of said conductors of a particular one of said phases is formed of a continuous conductor.

12. A stator for an automotive alternator, comprising:

a generally cylindrically-shaped stator core having a plurality of circumferentially spaced and axially-extending core teeth that define a plurality of circumferentially spaced and axially-extending core slots in a surface thereof, said core slots extending between a first and a second end of said stator core;

a stator winding having a plurality of phases, each of said phases including at least one conductor having a plurality of slot segments housed in said core slots, said slot segments alternately connected at said first and second ends of said stator core by a plurality of end loop segments;

said slot segments are inserted into said core slots of said generally cylindrically-shaped stator core in a substantial radial direction;

said stator winding including at least one of said end loop segments which connects a first of said slot segments housed in a radial position of one of said core slots with a second of said slot segments housed in the same radial position of another one of said core slots; and at least one of said core teeth adjacent said one of said of core slots having a distal end that is staked for an axial length that is shorter than the axial length of said stator core, such that the distal end of said at least one core tooth is flared outward circumferentially on at least one side of said distal end such that said at least one of said core slots has at least a portion of the opening width of said core slot which is smaller than the width of said slot segments housed in the same at least one of said core slots, said slot segments housed in said core slots are aligned in at least one radial row in at least one core slot.

13. The stator according to claim 12 wherein said winding includes at least one half of said end loop segments which connect a first of said slot segments housed in a radial position of one of said core slots with a second of said slot segments housed in the same radial position of another one of said core slots.

14. The stator according to claim 13 wherein said winding includes said conductors formed in a cascaded winding.

15. The stator according to claim 13 wherein said conductor is comprised of at least one continuous conductor.

16. The stator according to claim 13 wherein said slot segments housed in said core slots have a substantial rectangular cross section.

17. The stator according to claim 13 wherein a width of said slot segments, including any insulation, fits closely to the width of said core slots, including any insulation.

* * * * *